(12) United States Patent
Mallookis et al.

(10) Patent No.: US 8,408,225 B2
(45) Date of Patent: Apr. 2, 2013

(54) COLLAPSIBLE SHELTER

(75) Inventors: Steven E. Mallookis, Littleton, CO (US); Steven B. Mallookis, Littleton, CO (US)

(73) Assignee: Go Papa, LLLC, Littleton, CO (US)

( * ) Notice: Subject to any disclaimer, the term of this patent is extended or adjusted under 35 U.S.C. 154(b) by 338 days.

(21) Appl. No.: 12/617,072

(22) Filed: Nov. 12, 2009

(65) Prior Publication Data

US 2011/0108079 A1    May 12, 2011

(51) Int. Cl.
    *E04H 15/50*     (2006.01)
(52) U.S. Cl. ..... 135/145; 135/131; 135/151; 135/120.3; 248/188.8; 403/171; 403/217
(58) Field of Classification Search ............... 135/135, 135/137, 143–147, 149, 151, 158, 905, 121–122, 135/130–131, 120.3; 403/171–173, 217–218; 248/188, 188.8–188.9
See application file for complete search history.

(56) References Cited

U.S. PATENT DOCUMENTS

| | | | | |
|---|---|---|---|---|
| 1,666,757 A * | 4/1928 | Snyder | | 135/146 |
| 1,735,737 A * | 11/1929 | Dial | | 135/147 |
| 3,193,228 A * | 7/1965 | Chion | | 256/69 |
| 4,779,635 A | 10/1988 | Lynch | | |
| 5,069,238 A * | 12/1991 | Marks | | 135/153 |
| 5,511,572 A | 4/1996 | Carter | | |
| 5,638,853 A | 6/1997 | Tsai | | |
| 5,701,923 A * | 12/1997 | Losi et al. | | 135/131 |
| 5,797,412 A * | 8/1998 | Carter | | 135/145 |
| 5,921,260 A | 7/1999 | Carter | | |
| 6,035,877 A | 3/2000 | Losi, Jr. et al. | | |
| 6,089,247 A | 7/2000 | Price | | |
| 6,240,940 B1 | 6/2001 | Carter | | |
| 6,363,664 B1 | 4/2002 | Brutsaert | | |
| 6,382,224 B1 * | 5/2002 | Carter | | 135/145 |
| 6,470,902 B1 * | 10/2002 | Carter | | 135/145 |
| 6,772,780 B2 * | 8/2004 | Price | | 135/131 |
| 6,899,112 B2 | 5/2005 | Tsai | | |
| 7,311,113 B2 | 12/2007 | Suh | | |
| 7,621,289 B2 * | 11/2009 | Ju | | 135/120.3 |
| 7,942,159 B2 * | 5/2011 | Choi | | 135/120.3 |
| 2005/0229962 A1 * | 10/2005 | Carter | | 135/131 |
| 2010/0043856 A1 * | 2/2010 | Park et al. | | 135/145 |

FOREIGN PATENT DOCUMENTS

| | | | |
|---|---|---|---|
| DE | 19834388 A1 * | 2/2000 | |
| JP | 2001003604 A * | 1/2001 | |
| JP | 2002188324 A * | 7/2002 | |

* cited by examiner

*Primary Examiner* — Winnie Yip
(74) *Attorney, Agent, or Firm* — Brooks, Cameron & Huebsch, PLLC

(57) ABSTRACT

A collapsible shelter is described herein. One embodiment includes at least three leg members, at least three base members, wherein the each base member includes an opening to receive one of the at least three leg members at an angle less than 90° relative to the bottom surface of the base member, at least two accordion-type collapsible truss assemblies connected to each leg via an upper corner connection mechanism and a lower corner connection mechanism, each accordion-type truss including at least four truss members interconnected by at least two pivotal v-joints and at least two pivotal x-joints, wherein the at least two pivotal v-joints each include two truss members coupled together with a coupling mechanism through openings in the two truss members, wherein the openings in the two truss members are configured to reduce shearing forces in the truss members by the coupling mechanism.

17 Claims, 9 Drawing Sheets

COLLAPSIBLE SHELTER

BACKGROUND

Portable collapsible shelters, e.g., folding canopies, can be designed for ease of transport, setup, and takedown. Such shelters can be useful for outdoor gatherings, temporary military posts, emergency cover, even indoor conferences or trade shows to provide a sense of distinction from other exhibits, among other uses.

Portable collapsible shelters can include accordion-type collapsible truss assemblies between supporting legs of the shelter. According-type collapsible truss assemblies can include a number of truss members interconnected at pivotal x-joints near truss member midpoints and at pivotal v-joints near truss member endpoints. The truss members may be connected at one endpoint to a portion of a shelter leg, e.g., at a slidable or fixed mounting bracket, and at another endpoint to another truss member at a pivotal v-joint. Thus, the accordion-type collapsible truss assembly can be expanded and collapsed to allow for ease of transport, setup, and takedown.

The use of materials to reduce weight and size of portable collapsible shelters has led to deformation and failure of truss members, particularly near pivotal v-joints. Such deformation can be caused, at least in part, by user abuse in forcing the operation of setup and takedown, or weather related axial bending stresses, among other causes. Also, reductions in size and weight of portable collapsible shelters can decrease the stability of the shelters.

Portable collapsible shelters can include a roof assembly that is made of materials that are flexible. Flexible material roof assemblies include some means of providing rigidity to the roof assembly, while reducing the weight and amount of material in the roof assembly when compared to shelters that include a radial inner truss to support the root. Some methods of providing rigidity to the roof assembly can limit the flexibility of the roof assembly and decrease or eliminate the benefits that a flexible roof assembly can provide to a portable collapsible shelter.

DETAILED DESCRIPTION

Figures 1A, 1B:
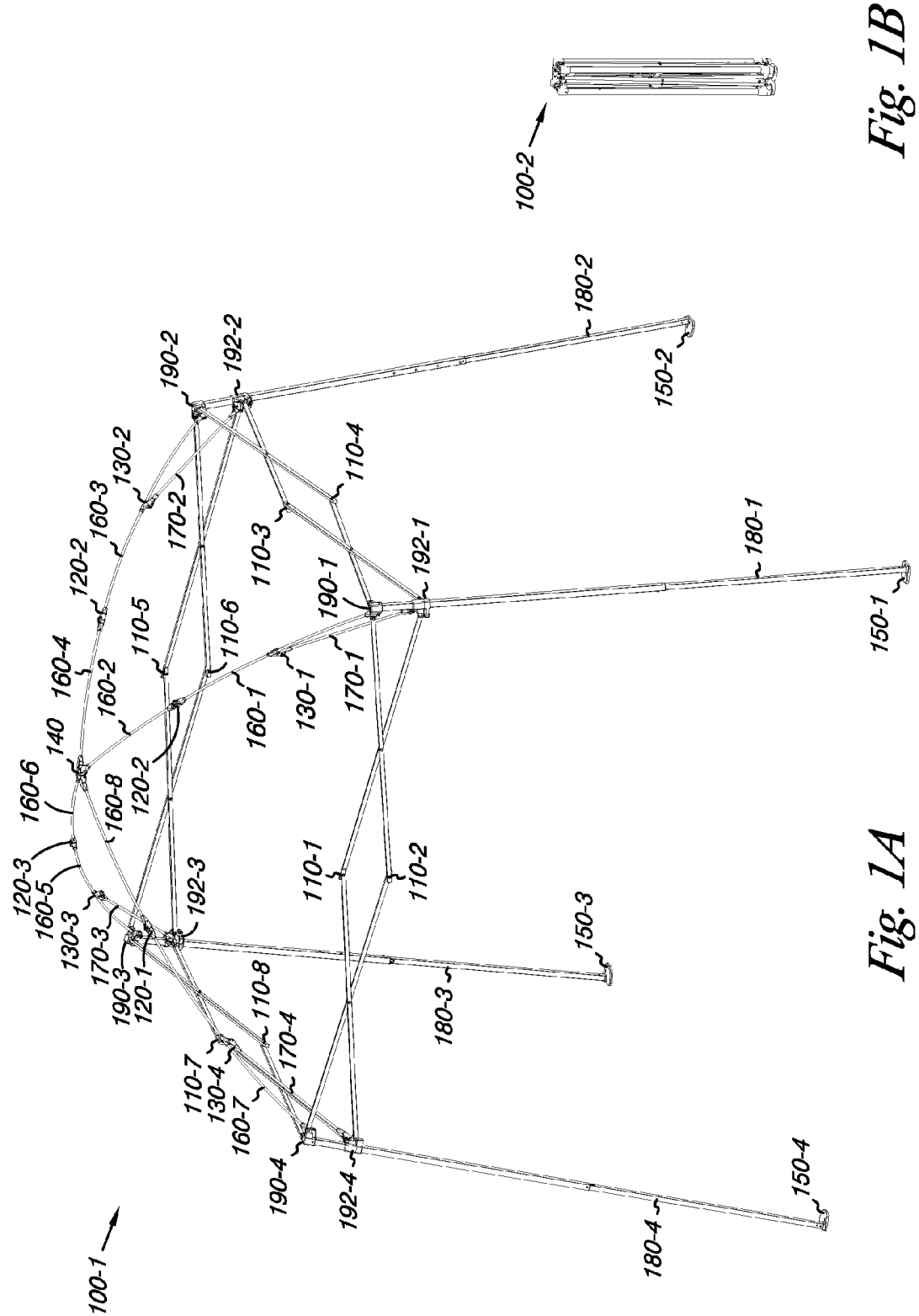
FIG. 1A illustrates a portable collapsible shelter in an open position according to one or more embodiments of the present disclosure.
FIG. 1B illustrates a portable collapsible shelter in a collapsed position according to one or more embodiments of the present disclosure.

A collapsible shelter is described herein. One embodiment includes at least three leg members, at least three base members, wherein the each base member includes an opening to receive one of the at least three leg members at an angle less than 90° relative to the bottom surface of the base member, at least two accordion-type collapsible truss assemblies connected to each leg via an upper corner connection mechanism and a lower corner connection mechanism, each accordion-type truss including at least four truss members interconnected by at least two pivotal v-joints and at least two pivotal x-joints, wherein the at least two pivotal v-joints each include two truss members coupled together with a coupling mechanism through openings in the two truss members, wherein the openings in the two truss members are configured to reduce shearing forces in the truss members by the coupling mechanism.

In one or more embodiments, a collapsible shelter can include a flexible cathedral roof assembly. The support members in the roof assembly can be made of fiberglass, therefore allowing the support members to provide flexibility and support for the roof while not requiring the added area and weight associated with an inner roof truss assembly. Also, using less material to form the roof assembly of the shelter can therefore reduce the cost of producing the shelter. In various embodiments, a cathedral roof assembly can provide a visually appealing slope for the roof that does not hold water or other debris, therefore making the roof assembly less susceptible to breakage from the forces water, wind, and other debris can place on the roof. The roof assembly can provide tension on the roof cover so that the roof cover does not sag creating pockets for water and other debris.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 140 may reference element "40" in FIG. 1A, and a similar element may be referenced as 640 in FIG. 6A. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present invention and are not to be used in a limiting sense.

FIG. 1A illustrates a portable collapsible shelter 100 in a collapsed position according to one or more embodiments of the present disclosure. Although various embodiments of the present disclosure are described within the context of a portable collapsible shelter, embodiments are not so limited. For example, embodiments of the present disclosure can be used with tables, chairs, or other devices having a collapsible structure.

The portable collapsible shelter 100-1 illustrated in FIG. 1 includes a number of legs, e.g., legs 180-1, 180-2, 180-3, and 180-4. A portable collapsible shelter can be configured with three legs to have a triangular base, four legs to have a rectangular base, or more legs for other bases. Embodiments are not limited to the number of legs given in the example embodiment of FIG. 1A. The legs, e.g., leg 180-1, can include telescoping lower portions to allow a user to adjust the height of the shelter. Each leg can be connected to a number of, e.g., two, accordion-type collapsible truss assemblies via a number of corner assemblies that include an upper corner support mechanisms, e.g., 190-1, 190-2, 190-3, and 190-4, and a lower corner support mechanisms, e.g., 192-1, 192-2, 192-3, and 192-4, where another end of each truss assembly can be connected to another leg and/or to a roof assembly. A fully collapsed portable shelter can provide for ease of transport due, at least in part, to its compact size as compared to an expanded shelter. In some embodiments, a carrying mechanism, e.g., a bag, can be provided to further ease transport of the shelter.

In FIG. 1A, the legs 180-1, 180-2, 180-3, and 180-4 are coupled to base members 150-1, 150-2, 150-3, and 150-4, respectively. The base members 150-1, 150-2, 150-3, and 150-4 can be configured to received the legs 180-1, 180-2, 180-3, and 180-4 at an angle less than 90° relative to the bottom surface of the base member. This configuration allows the area of footprint of the shelter to be greater than the area of the roof support structure.

The portable collapsible shelter 100-1 in FIG. 1A also includes a roof support structure that includes a number of truss assemblies and a number of shelter support members that are coupled to the legs. The truss assemblies can includes a number of v-joints 110-1, 110-2, 110-3, 110-4, 110-5, 110-6, 110-7, and 110-8. The v-joints 110-1, 110-2, 110-3, 110-4, 110-5, 110-6, 110-7, and 110-8 can be configured to prevent shearing of the truss members forming the v-joint by a coupling mechanism.

The roof support structure can also include a number of shelter support members, e.g., 160-1, 160-2, 160-3, 160-4, 160-5, 160-6, 160-7, 160-8, 170-1, 170-2, 170-3, and 170-4. The shelter support members can be coupled together to form a roof assembly. The shelter support members can be coupled together using connection mechanisms, e.g., 120-1, 120-2, 120-3, 120-4, 130-1, 130-2, 130-3, 130-4, and 140.

In FIG. 1A, leg 180-1 has a number of shelter support members and connection mechanisms associated with the leg to form the support structure for leg 180-1. FIG. 1A shows a number of legs and associated support structure elements. In the following paragraphs, the support structure elements for leg 180-1, the other legs 180-2, 180-3, and 180-4 have similar and/or the same support structure elements associated with each leg respectively.

Shelter support member 160-1 in FIG. 1A can be coupled to an upper portion of the truss assembly at upper corner support mechanism 190-1. Shelter support member 160-1 can be coupled to shelter support member 160-2 via connection mechanism 120-2. Connection mechanism 120-2 can allow shelter support members 160-1 and 160-2 to rotate relative to each other in a rotation that is greater than 180'. Shelter support member 160-2 can be coupled to connection mechanism 140 at the center, e.g., peak, of the roof assembly where other support members associated with other legs of the shelter are coupled. Each support member can extend from the top of a leg to a center of the shelter, where the support members can collectively support the roof. The roof can be a fabric roof that is coupled to the roof assembly. In one or more embodiments, the shelter support members can be formed from a flexible material, e.g., fiberglass. The shelter support members can be configured in the roof assembly to provide a peak in the roof that is approximately 3 feet higher than the top of a truss assembly. A peak of this height can provide a slope that is visually appealing and reduce the built of up of water and debris on the roof of the shelter. In some embodiments, each shelter support member can include two or more flexible material sections removably connected together, e.g., by an internal elastic string. Embodiments are not so limited.

Shelter support member 170-1 can be coupled to a lower portion of the truss assembly at lower corner support mechanism 192-1 and to connection mechanism 130-1. Connection mechanism 130-1 can allow shelter support member 170-1 and 170-2 to rotate relative to each other. Also, connection mechanism 130-1 can have openings that allow shelter support member 160-1 to pass through the openings in the connection mechanism, therefore connection mechanism 130-1 can move along shelter support member 160-1 over its longitudinal axis and shelter support member 170-1 can change its relative position and angle to shelter support member 160-1 as the connection mechanism 130-1 moves along shelter support member 160-1.

FIG. 1B illustrates the portable collapsible shelter 100-1 of FIG. 1A in a collapsed configuration. In FIG. 1B, the portable collapsible shelter 100-2 has the roof support structure collapsed between each of the legs and the legs have their telescoping legs in the shortest position.

The portable collapsible shelter in FIGS. 1A and 1B include a number of collapsible truss assemblies. Each accordion-type collapsible truss assembly can include a number of truss assembly members interconnected by at least two pivotal v-joints, e.g., 110-1 and 110-2, and two pivotal x-joints.

For example, a collapsible truss assembly extending between two legs 180-1 and 180-2 can include four truss members. A first truss member can be secured at one end to a fixed mounting bracket near the top of a first leg. The first truss member can be interconnected with a second truss member at a pivotal x-joint near a midpoint of the first and second truss members. The first truss member can be interconnected with a third truss member at a pivotal v-joint at the other end of the first truss member.

The second truss member can be secured on one end to a slidable mounting bracket on the first leg. The second truss member can also be secured to a fourth truss member at a pivotal v-joint at the other end. The third truss member can be interconnected with the fourth truss member at an x-joint and secured to a second leg at a fixed mounting bracket near the top of the second leg. The fourth truss member can be secured to the second leg at a slidable mounting bracket. Embodiments are not so limited.

As illustrated in FIGS. 1A-1B, the pivotal v-joints, pivotal x-joints, and slidable mounting brackets can allow the collapsible shelter to contract to a relatively small configuration, and to expand to a larger area. During expansion, the slidable mounting brackets can move up, e.g., away from the ground, on the legs of the collapsible shelter. The fixed mounting brackets and the slidable mounting brackets can be configured to receive the legs at an angle that is greater or less than 90° relative to a side surface of the bracket and/or the surface that the shelter is placed upon. At the same time, the pivotal v-joints and x-joints can allow the truss members to pivot with respect to each other, expanding the shelter like an accordion. During contraction, the slidable mounting brackets can move down, e.g., toward the ground, on the legs of the collapsible shelter. At the same time, the pivotal v-joints and x-joints can allow the truss members to pivot with respect to each other, e.g., opposite of the pivot during expansion.

The truss members can be interconnected at the pivotal x-joints and v-joints via a coupling mechanism passing through one or more openings in the truss members. For example, the truss members can be interconnected at pivotal x-joints via a bolt passing through an opening at a longitudinal midpoint in each of the two truss members associated with the pivotal x-joint.

Figure 2A:
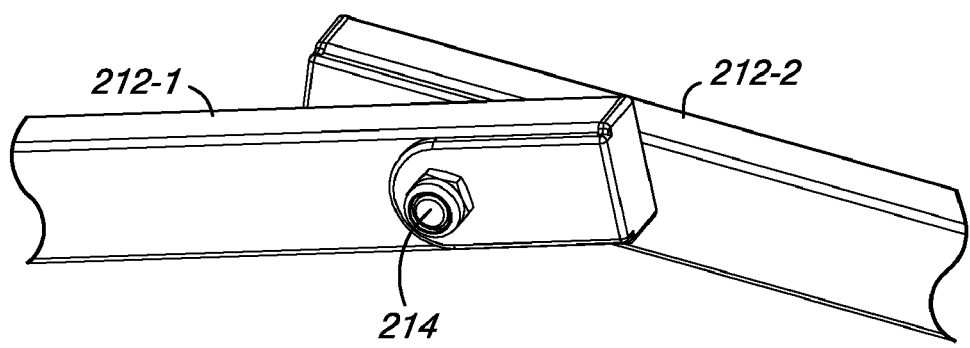
FIGS. 2A-B illustrate a v-joint of a truss for a portable collapsible shelter having a cathedral support roof according to one or more embodiments of the present disclosure.
Figure 2B:
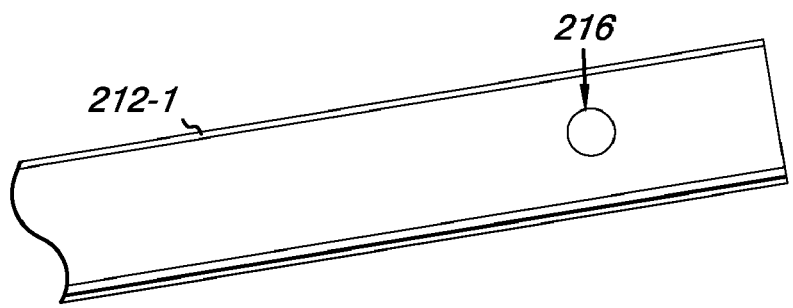

FIGS. 2A-B illustrate a v-joint of a truss assembly for a portable collapsible shelter having a cathedral support roof according to one or more embodiments of the present disclosure. In FIG. 2A, v-joint 210 includes a first truss member 212-1 and a second truss member 212-2. The first truss member 212-1 and 212-2 are coupled together with coupling mechanism 214. In one or more embodiments, a coupling mechanism can be a bolt, among other coupling mechanisms. The coupling mechanism 214 can be place through an opening in each of the truss members.

The opening 216 for truss member 212-1 is shown in FIG. 2B. The opening 216 in truss member 212-1 is located at a distance from the end of the truss member 212-1 to prevent failure of the truss member by the connection mechanism shearing the truss member. The truss member 212-1 has sufficient material between the opening and the end of the truss member so as to dissipate the stress concentration caused by the connection mechanism exerting forces near the opening 216. In some instances, forces applied to the collapsible truss assembly can result in failure, e.g., shearing, at or near a pivotal v-joint, e.g., near opening 216, associated with a coupling mechanism in one or more truss members. Forces received at v-joints along a longitudinal length of the coupling mechanism, e.g., bolt, may result in significant shear stress on the connecting member and truss members at the pivotal v-joint. Such forces may be associated with wind, pocketing of moisture, user operation, and other sources. Other potentially damaging forces associated with operation of a portable collapsible shelter will be appreciated by one of ordinary skill in the art. Other applied forces and/or conditions can cause deformation and/or failure near a pivotal v-joint.

Embodiments including a v-joint, e.g., 210, in one or more truss assemblies of a portable collapsible shelter can provide a number of advantages over prior art portable collapsible shelter. For example, the v-joint 210 can provide additional strength to the truss members at the joint to withstand breaking and shearing stresses and torsion, among others forces. One of ordinary skill in the art, having read and understood the present disclosure will appreciate additional advantages of the embodiments described herein.

Figure 3A:
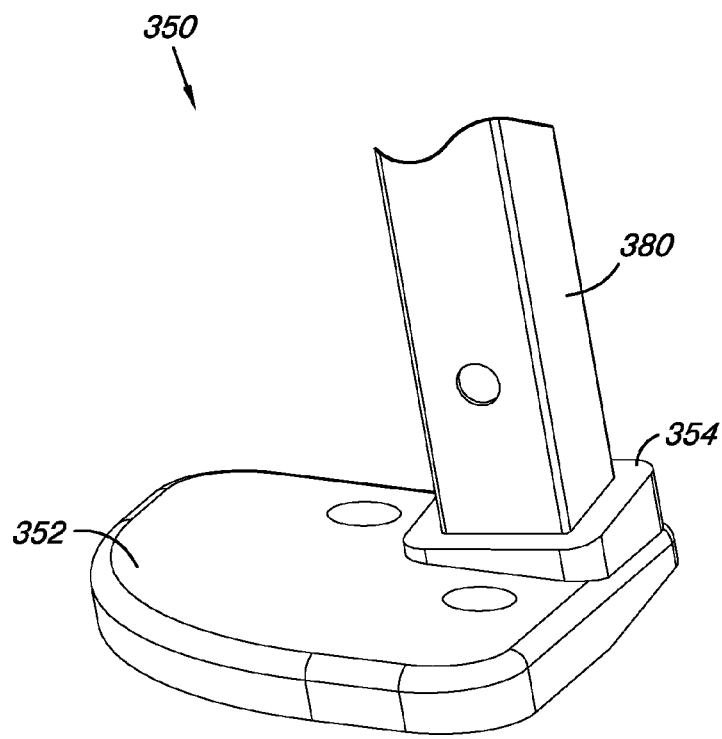
FIGS. 3A-B illustrate a base member for a portable collapsible shelter having a cathedral support roof according to one or more embodiments of the present disclosure.
Figure 3B:
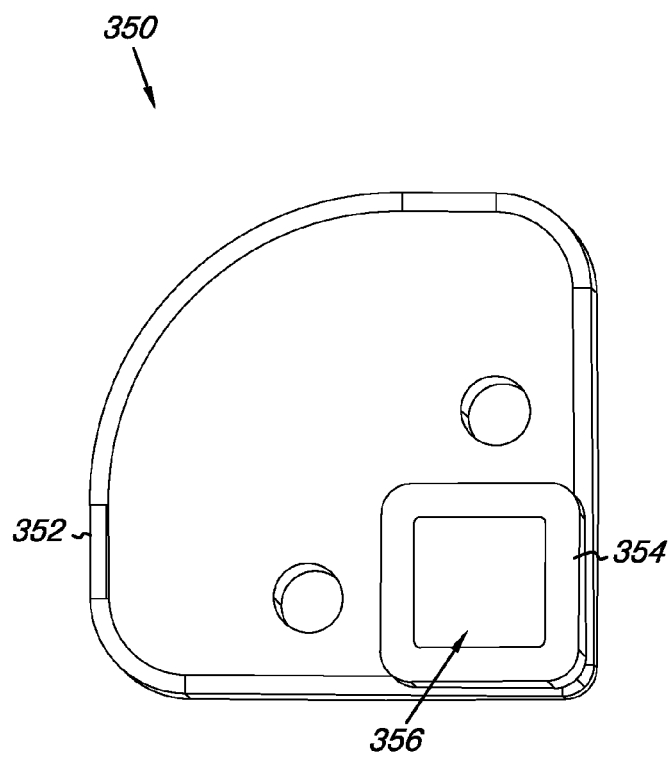

FIGS. 3A-B illustrate a base member for a portable collapsible shelter having a cathedral support roof according to one or more embodiments of the present disclosure. In FIGS. 3A-B a base member 350 is shown that includes a bottom portion 352 and a leg receiving portion 354. Leg receiving portion 354 is configured to receive leg 380 in opening 356 at an angle that is less that 90° relative to the bottom surface of the bottom portion 352 of the base member 350. In embodiments with receiving leg 380 at this angle allows for a greater base area between the legs for a shelter by having the legs extend out in three dimensions from the truss assembly. The greater base area can provide more stability for the shelter making the shelter less likely to move and/or tip due to external forces, such as wind, among other external forces. The bottom portion 352 of base member 350 can be flush with a supporting surface due to the opening 354 of base member 350 receiving the leg 380 at an angle.

Figure 4A:
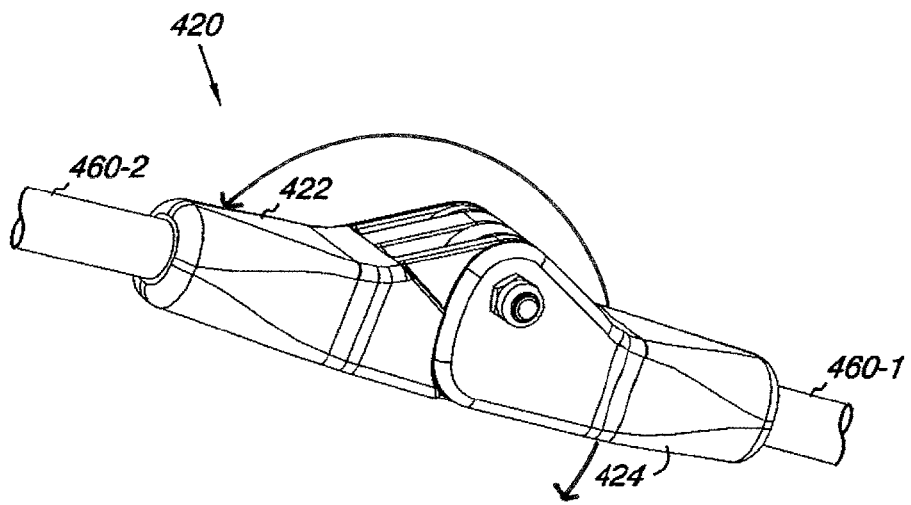
FIGS. 4A-B illustrate an intermediate shelter support member connection mechanism for a portable collapsible shelter having a cathedral support roof according to one or more embodiments of the present disclosure.
Figure 4B:
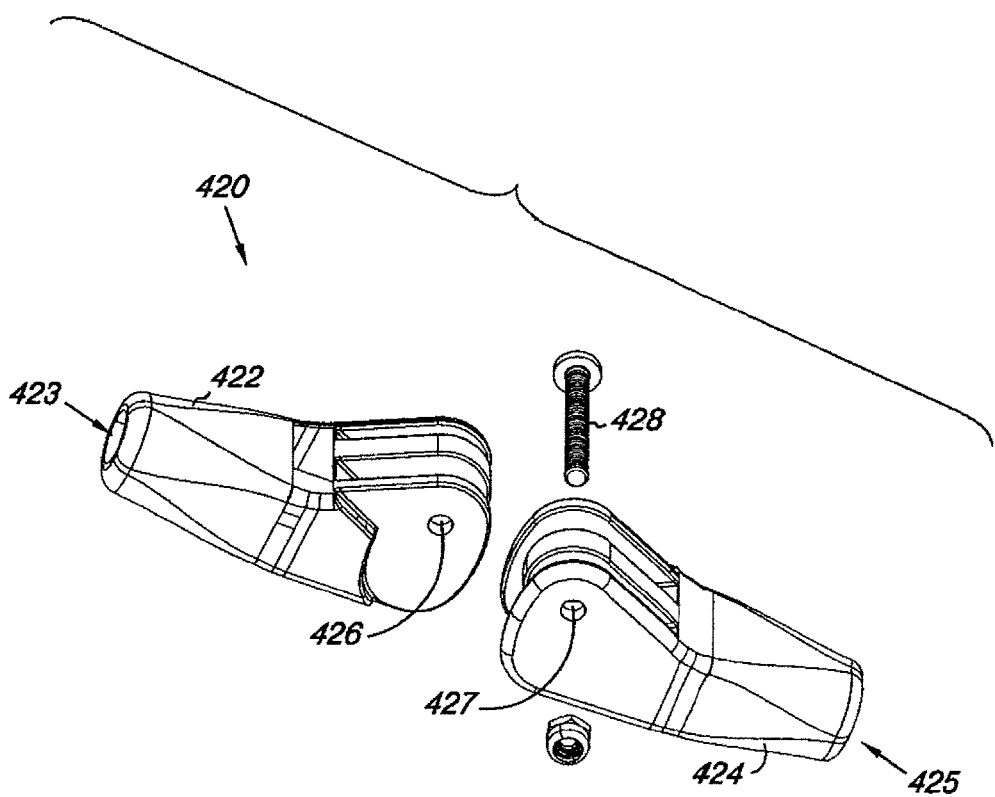

FIGS. 4A-B illustrate an intermediate shelter support member connection mechanism for a portable collapsible shelter having a cathedral support roof according to one or more embodiments of the present disclosure. In FIGS. 4A-B, a shelter support member connection mechanism 420 is shown. The connection mechanism can be used to couple two shelter support members and allow the shelter support members to rotate relative to one another.

In FIGS. 4A-B, connection mechanism 420 includes a first piece 422 and a second piece 424. The first piece 422 and second piece 424 are coupled together with coupling mechanism 428. The first piece 422 includes an opening 423 to receive shelter support member 460-2 and the second piece 424 includes an opening 425 to receive shelter support member 460-1. The shelter support members 460-2 and 460-1 can be inserted in openings 423 and 425, respectively, and coupled to the first piece 422 and the second piece 424, respectively. The shelter support members 460-2 and 460-1 can rotate relative to each other about the coupling mechanism 428 in a rotation that is greater than 180°, wherein the shelter support members can have one surface touch of member 460-1 touch a surface of member 460-2 when the members are rotated fully in one direction and the opposite surface of member 460-1 can contact the opposite surface of member 460-2 when the members are rotated fully in the opposite direction.

In one or more embodiments, the connection mechanism can include a surface that can be in contact with a shelter cover that can prevent the shelter cover from coming into contact with the shelter support members and/or other elements of the shelter. The connection mechanism can provide tension on the shelter cover so the shelter cover is supported by a number of connection mechanisms in a roof assembly for the shelter.

In one or more embodiments, the connection mechanism in FIGS. 4A-B can be part of a roof assembly for a portable collapsible shelter. The roof assembly can include a number of connection mechanisms that couple a number of shelter support members together. The connection mechanisms can provide a joint for the shelter support members to connect and allow the shelter support members one or more degrees of freedom relative to another shelter support member that is coupled at the connection mechanism. The shelter support members that are coupled to the connection mechanism can be coupled to a truss assembly and/or a leg of the shelter. The connection mechanism can be an intermediate coupling point for the shelter support members that are between the truss assemblies and/or legs and the center connection mechanism. The connection mechanism and the shelter support members can form a portion of the roof assembly that provides structural and load bearing support for the shelter.

Figure 5A:
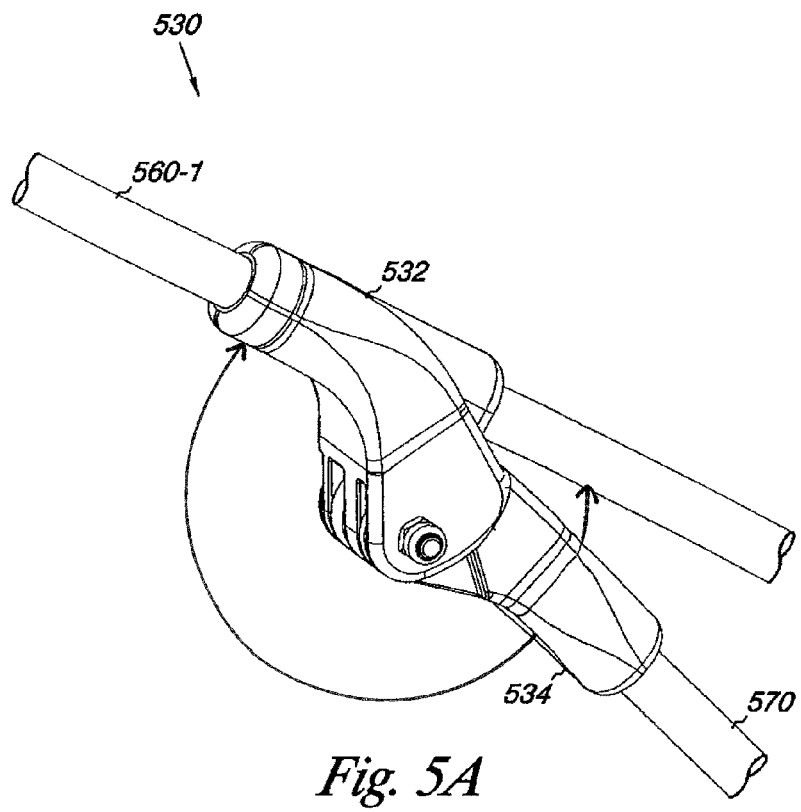
FIGS. 5A-B illustrate a slidable shelter support member connection mechanism for a portable collapsible shelter having a cathedral support roof according to one or more embodiments of the present disclosure.
Figure 5B:
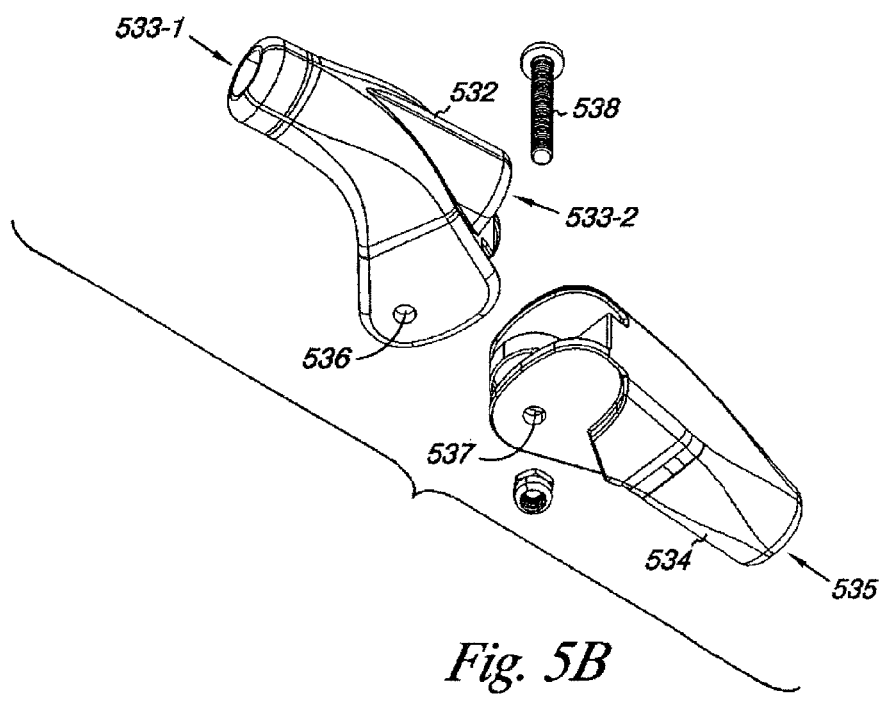

FIGS. 5A-B illustrate a slidable shelter support member connection mechanism for a portable collapsible shelter having a cathedral support roof according to one or more embodiments of the present disclosure. In FIGS. 5A-B, a shelter support member connection mechanism 530 is shown. The connection mechanism can be used to couple two shelter support members and allow the shelter support members to rotate and slide relative to one another.

In FIGS. 5A-B, connection mechanism 530 includes a first piece 532 and a second piece 534. The first piece 532 and second piece 534 are coupled together with coupling mechanism 538. The first piece 532 includes a first opening 533-1 and a second opening 533-2 to receive shelter support member 560-1 and the second piece 534 includes an opening 535 to receive shelter support member 570. The shelter support member 560-1 can pass through openings 533-1 and 533-2 allowing piece 532 to pass over support member 560-1. The shelter support member 570 can be inserted into opening 535 of piece 534. The shelter support members 560-1 and 570 can rotate relative to each other about the coupling mechanism 538 in a rotation greater than 180°, wherein the shelter support members can have one surface touch of member 560-1 touch a surface of member 570 when the members are rotated fully in one direction and the opposite surface of member 560-1 can contact the opposite surface of member 570 when the members are rotated fully in the opposite direction.

The connection mechanism in FIGS. 5A-B can allow support member 570 to move relative to support member 560-1 along the longitudinal axis of support member 560-1. Support member 570 can be coupled to piece 534 which is coupled to piece 532 via coupling mechanism 538. These elements, e.g., support member 570 and pieces 534 and 532, which are coupled together can move relative to support member 560-1 as support member 560-1 passes through piece 532 via openings 533-1 and 533-2.

In one or more embodiments, the connection mechanism in FIGS. 5A-B can be part of a roof assembly for a portable collapsible shelter. The roof assembly can include a number of connection mechanisms that couple a number of shelter support members together. The connection mechanisms can provide a joint for the shelter support members to connect and allow the shelter support members one or more degrees of freedom relative to another shelter support member that is coupled at the connection mechanism. The shelter support members that are coupled to the connection mechanism can be coupled to an upper portion and a lower portion of a truss assembly and/or a leg of the shelter. The connection mechanism can be an intermediate coupling point for the shelter support members that are between the truss assemblies and/or legs and the center connection mechanism. The connection mechanism and the shelter support members can form a portion of the roof assembly that provides structural and load bearing support for the shelter.

Figure 6A:
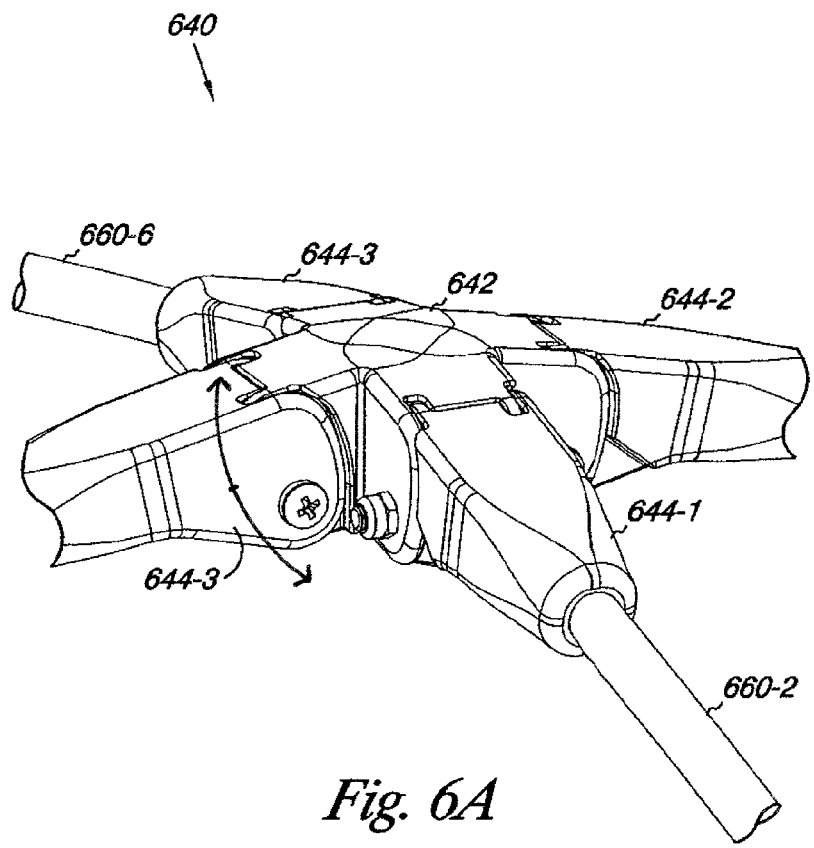
FIGS. 6A-B illustrate a center shelter support member connection mechanism for a portable collapsible shelter having a cathedral support roof according to one or more embodiments of the present disclosure.
Figure 6B:
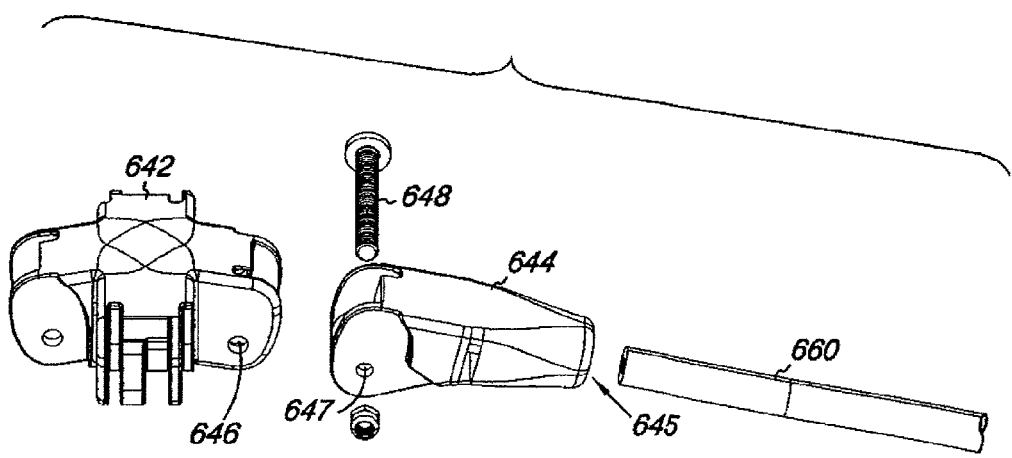

FIGS. 6A-B illustrate a center shelter support member connection mechanism for a portable collapsible shelter having a cathedral support roof according to one or more embodiments of the present disclosure. In FIGS. 6A-B, a shelter support member connection mechanism 640 is shown. The connection mechanism can be used to couple a number shelter support members and allow the shelter support members to rotate relative to one another.

In FIGS. 6A-B, connection mechanism 640 includes a center piece 642 and a first radial piece 644-1, a second radial piece 644-2, a third radial piece 644-3, and a fourth radial piece 644-4. The radial pieces are each coupled to the center piece with a coupling mechanism. In FIG. 6B, radial piece 644 can be coupled to center piece 642 with coupling mechanism 648. The coupling mechanism 648 passes through opening 646 of the center piece and opening 647 of the radial piece 644. The center piece 642 and radial piece 644 can rotate relative to each other around the coupling mechanism 648.

The radial piece 644 includes an opening 645 to receive shelter support member 660. The support member 660 can rotate relative to the center piece which it is coupled to via radial piece 644. In one or more embodiments, a shelter that includes a number of support members that are coupled to the center piece 642 via coupling mechanism, e.g., 648, can rotate relative to each other allowing a portion of the roof assembly associated with a specific leg of the shelter to have movement independent of and relative to another portion of the roof assembly associated with another leg of the shelter.

In one or more embodiments, the connection mechanism in FIGS. 6A-B can be part of a roof assembly for a portable collapsible shelter. The roof assembly can include a connection mechanism that couples a number of shelter support members together at a center connection point of the roof assembly. The connection mechanisms can provide a joint for the shelter support members to connect and allow the shelter support members one or more degrees of freedom relative to other shelter support members that are coupled at the connection mechanism. The connection mechanism and the shelter support members can form a portion of the roof assembly that provides structural and load bearing support for the shelter.

In one or more embodiments, the coupling mechanisms can include a non-compression shaft with a smooth exterior and a hollow threaded interior. The non-compression shaft can include a polygonal head that can be secured within an annulus portion having a polygonal geometry. The connecting member can include a screw threaded to fit within the threaded interior of the non-compression shaft. The screw can have any of a variety of heads including those with a circular or polygonal geometry. The screw may be socket driven, for example.

Such embodiments can be beneficial in helping to prevent over tightening of the coupling mechanism that can lead to reduced adjustability, e.g., increased friction at one or more pivotal joints that makes it difficult for a user to expand and/or collapse the shelter. Such embodiments can be beneficial in helping to prevent damage to the truss member and/or connection mechanism from over tightening the connecting member, e.g., crushing the truss member and/or connection mechanism. Such embodiments can be useful in helping to prevent the collapsible truss assembly and/or roof assembly from becoming loose, which could lead to instability or failure of the collapsible truss assembly and/or roof assembly, or complete detachment in certain areas with repeated expansion and contraction of the collapsible shelter. That is, according to one or more embodiments described herein, the various truss members and/or shelter support members can be allowed to rotate at the pivotal v-joints and/or connection mechanisms, but such rotation may have a reduced ability to allow the connecting member to tighten or loosen. Furthermore, the annulus portion can help to prevent the coupling mechanism from damage, e.g., from being struck by objects moving along a longitudinal portion of the truss member, among other benefits.

Figure 7:
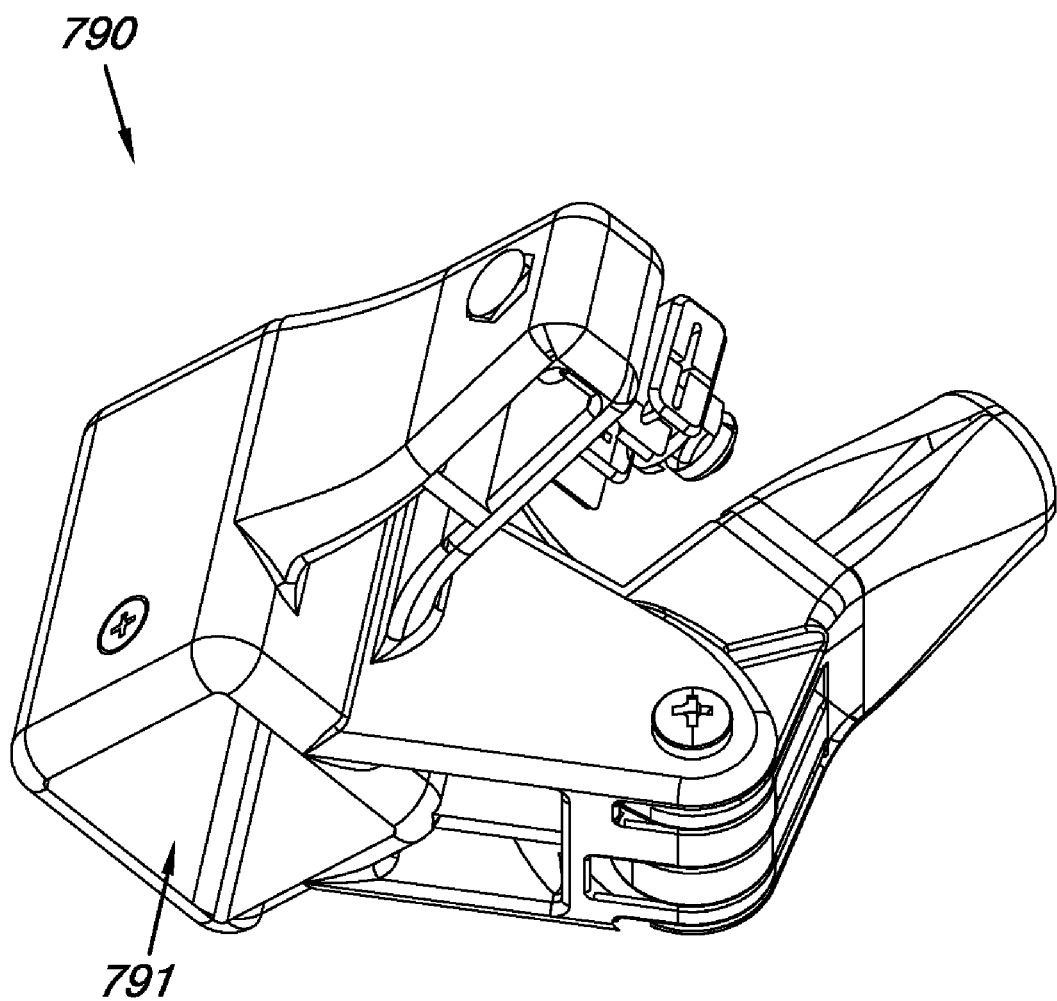
FIG. 7 illustrates an upper corner support mechanism for a portable collapsible shelter having a cathedral support roof according to one or more embodiments of the present disclosure.

FIG. 7 illustrates an upper corner support mechanism 790 for a portable collapsible shelter having a cathedral support roof according to one or more embodiments of the present disclosure. In FIG. 7, upper corner support mechanism 790 can include an opening 791. Opening 791 can be configured to receive a leg, e.g., leg 180-1 in FIG. 1, which is part of the portable collapsible shelter. Opening 791 can be configured to receive a leg at an angle that is less than and/or greater than 90° from a bottom surface of a base member, e.g. not parallel to a side surface of upper corner support mechanism 790. Opening 791 can be configured so that the leg is not 90°, e.g., not perpendicular, to the plane of the bottom surface of the upper corner support mechanism 790. The opening 791 receiving a leg at an angle that is less than and/or greater than 90° can allow the legs in each corner of a portable collapsible shelter to angle out from the corner support mechanisms creating a footprint on the ground that is greater than the area between the truss assemblies and the corner support mechanisms. The greater footprint created by the angled legs in the corner support mechanisms can provide for a stable portable collapsible shelter that is less susceptible to tipping forces. Opening 791 at an angle less than and/or greater than 90° from a bottom surface of a base member can reduce the resistance between a leg and the upper corner support mechanism 790 when the upper corner support mechanism 790 is moved along the leg during set up and/or take down of the shelter.

Upper corner support mechanism 790 can be part of a corner assembly that can be coupled to truss members that are part of truss assemblies and also coupled to shelter support members that are part of a roof assembly. The upper corner support mechanism 790 can be include in each corner of a portable collapsible shelter and provide a connection mechanism for the legs, truss assemblies, and roof assembly of a portable collapsible shelter.

Figure 8:
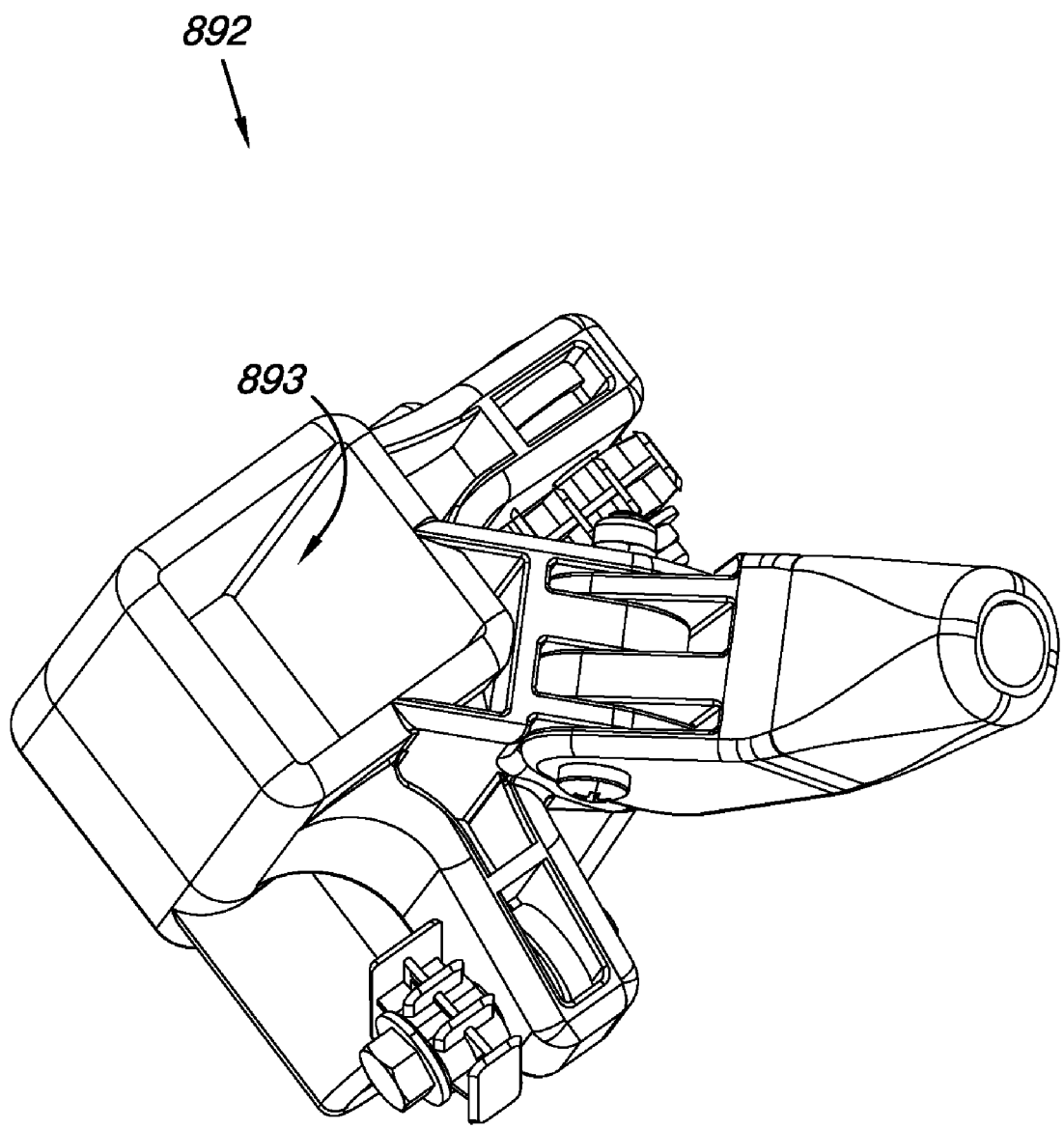
FIG. 8 illustrates a lower corner support mechanism for a portable collapsible shelter having a cathedral support roof according to one or more embodiments of the present disclosure.

FIG. 8 illustrates a lower corner support mechanism for a portable collapsible shelter having a cathedral support roof according to one or more embodiments of the present disclosure. In FIG. 8, lower corner support mechanism 892 can include an opening 893. Opening 893 can be configured to receive a leg; e.g., leg 180-1 in FIG. 1, which is part of the portable collapsible shelter. The leg can travel through the lower corner support mechanism 892 through the opening 893. The lower corner support mechanism 892 can travel along a leg when the shelter is being opened and/or collapsed and can be positioned and secured at an opening in a leg with a pin. The pin can be used to secure the lower corner support mechanism 892 in a position on a leg. The pin can be associated with an assembly that includes a spring to provide tension on the pin to secure the pin in an opening in a leg. A force can be applied to the assembly with the spring to remove the tension on the pin allowing the lower corner support mechanism to move relative to the leg without interference from the pin. Opening 893 can be configured to receive a leg at an angle that is less than and/or greater than 90° from a bottom surface of a base member, e.g. not parallel to a side surface of upper corner support mechanism 892. Opening 893 can be configured so that the leg is not 90°, e.g., not perpendicular, to the plane of the bottom surface of the upper corner support mechanism 892. The opening 893 receiving a leg at an angle that is less than and/or greater than 90° can allow the legs in each corner of a portable collapsible shelter to angle out from the corner support mechanisms creating a footprint on the ground that is greater than the area between the truss assemblies and the corner support mechanisms. Opening 893 at an angle less than and/or greater than 90° from a bottom surface of a base member can reduce the resistance between a leg and the lower corner support mechanism 892 when the lower corner support mechanism 892 is moved along the leg during set up and/or take down of the shelter.

Lower corner support mechanism 892 can be part of a corner assembly that can be coupled to truss members that are part of truss assemblies and also coupled to shelter support members that are part of a roof assembly. The upper corner support mechanism 892 can be include in each corner of a portable collapsible shelter and provide a connection mechanism for the legs, truss assemblies, and roof assembly of a portable collapsible shelter.

Figure 9:
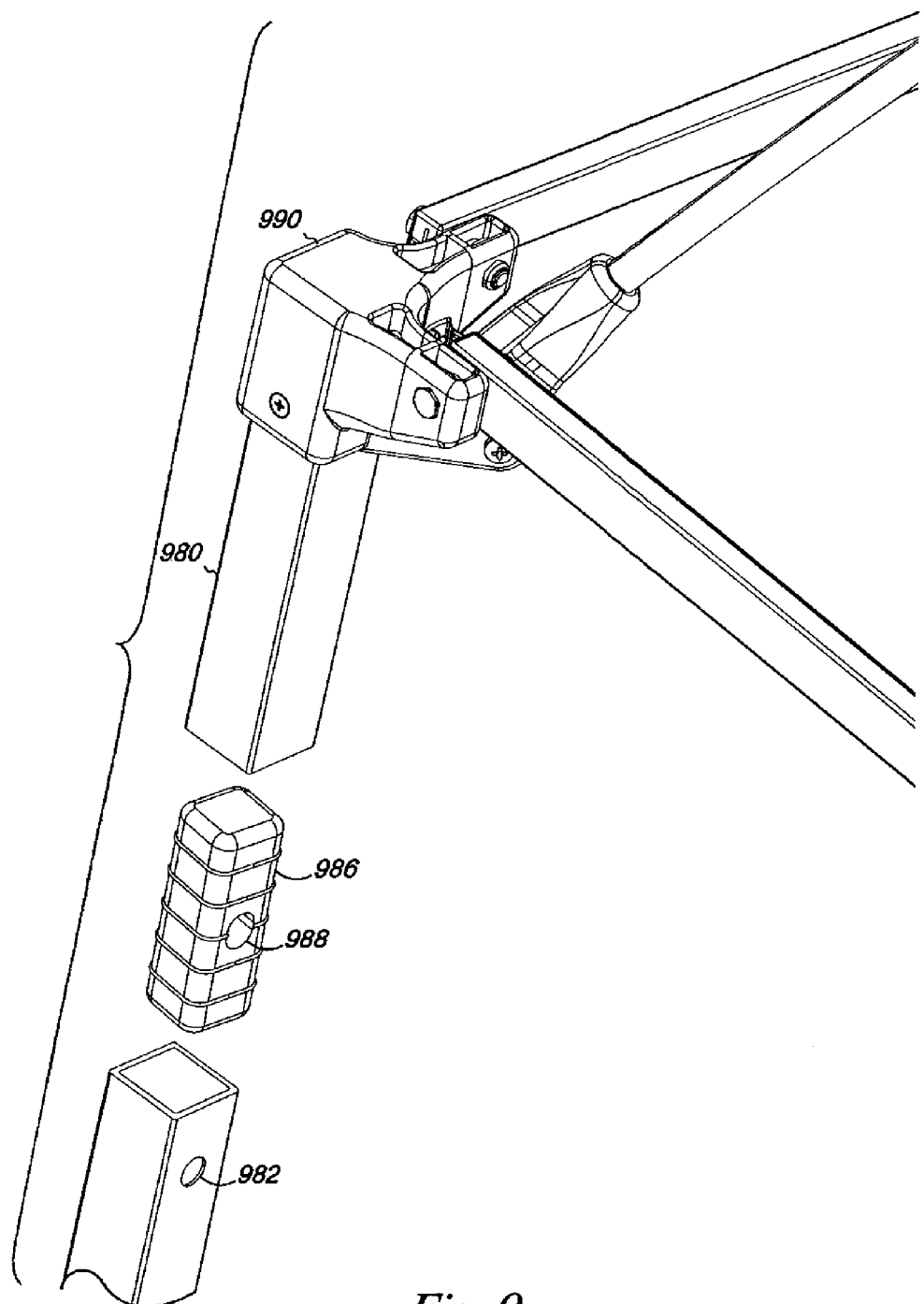
FIG. 9 illustrates a corner assembly for a portable collapsible shelter having a cathedral support roof according to one or more embodiments of the present disclosure.

FIG. 9 illustrates a corner assembly for a portable collapsible shelter having a cathedral support roof according to one or more embodiments of the present disclosure. In FIG. 9, the corner assembly includes an upper corner support mechanism 990 that is coupled to truss members and shelter support members. The upper corner support mechanism 990 is also coupled to a leg 980. Leg 980 includes an internal support body 986 in the inner shaft of the leg 980. The internal support body 986 can provide added support in the leg 980 to resist shearing and bending forces that are exerted on the leg 980. The internal support body 986 is located proximate to opening 982 in leg 980. Opening 982 is configured to receive a pin that holds a lower corner support mechanism in place on leg 980. The area of the leg 980 around opening 982 can be weaker because of the stress concentrations associated with the opening 982. The internal support body 986 can strengthen this area of the leg 980 thereby reducing the negative affects of the stress concentrations caused by opening 982. The internal support body 986 can include an opening 988 to receive the pin that holds a lower corner support mechanism in place on leg 980.

In one or more embodiments, the upper corner support mechanism 990 can have a top edge that is beveled. The beveled edge can provide a smooth surface for a shelter cover to travel over and rest upon. A smooth surface can make the shelter cover easier to position over the shelter frame and lessen the likelihood that the top edge of the upper corner support mechanism will tear the shelter cover because the top edge does not have a sharp surface to pierce the shelter cover.

In one or more embodiments, a leg can include a channel that is configured to provide an area for a pin to travel in when the lower corner support mechanism is moved along the leg. The channel can reduced the resistance between the leg and pin when the lower corner support mechanism is moved along the leg, allowing for easier movement of the lower corner support mechanism and less wear on the leg and lower corner support mechanism when opening and/or collapsing the portable shelter.

A collapsible shelter is described herein. One embodiment includes at least three leg members, at least three base members, wherein the each base member includes an opening to receive one of the at least three leg members at an angle less than 90° relative to the bottom surface of the base member, at least two accordion-type collapsible truss assemblies connected to each leg via an upper corner connection mechanism and a lower corner connection mechanism, each accordion-type truss including at least four truss members interconnected by at least two pivotal v-joints and at least two pivotal x-joints, wherein the at least two pivotal v-joints each include two truss members coupled together with a coupling mechanism through openings in the two truss members, wherein the openings in the two truss members are configured to reduce shearing forces in the truss members by the coupling mechanism.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. As used herein, the term "and/or" includes any and all combinations of one or more of the associated listed items.

It will be understood that, although the terms first, second, etc. may be used herein to describe various elements and that these elements should not be limited by these terms. These terms are only used to distinguish one element from another element. Thus, a first element could be termed a second element without departing from the teachings of the present disclosure.

Although specific embodiments have been illustrated and described herein, those of ordinary skill in the art will appreciate that an arrangement calculated to achieve the same techniques can be substituted for the specific embodiments shown. Combination of the above embodiments, and other embodiments not specifically described herein will be apparent to those of skill in the art upon reviewing the above description. The scope of the various embodiments of the invention includes other applications in which the above structures and methods can be used. Therefore, the scope of various embodiments of the invention should be determined with reference to the appended claims, along with the full range of equivalents to which such claims are entitled.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A collapsible shelter, comprising:
   at least three leg members;
   at least three base members, wherein the each base member includes an opening formed by sidewalls at an angle less than 90° relative to a bottom surface of the base member to receive one of the at least three leg members at an angle less than 90° relative to the bottom surface of the base member;
   at least two collapsible truss assemblies connected to each leg via an upper corner connection mechanism and a lower corner connection mechanism, each truss assembly including at least four truss members interconnected by at least two pivotal v-joints and at least two pivotal x-joints, wherein the at least two pivotal v-joints each include:
      two truss members coupled together with a coupling mechanism through openings in the two truss members, wherein the openings in the two truss members are proximate to an end of the truss members that are coupled together; and
   a number of internal support bodies, each situated within one of the at least three leg members so that an outer surface of the internal support bodies is flush with a number of inner surfaces of the at least three leg members, wherein each of the number of internal support bodies includes an opening to receive a pin that couples the lower corner connection mechanism to the leg members.

2. The shelter of claim 1, wherein the portable collapsible shelter includes a roof support structure coupled to the at least two collapsible truss assemblies.

3. The shelter of claim 2, wherein the roof support structure includes an intermediate connection mechanism with a first piece coupled to a second piece at a hinge that allows the first piece and second piece to rotate relative to one another with a rotation greater than 180°.

4. The shelter of claim 2, wherein the roof support structure includes a slidable connection mechanism that includes a first piece with a first opening and second opening to receive a first shelter support member and a second piece with an opening to receive a second shelter support member, wherein the first piece and the second piece are coupled at a hinge that allows the first shelter support structure and the second shelter support member to rotate relative to one another, and wherein the first piece is configured to allow the first shelter support member to pass through the first opening and second opening of the first piece; and wherein the first piece can pass over the first shelter support member along the longitudinal axis of the first shelter support member.

5. The shelter of claim 2, wherein the roof support structure includes a center connection mechanism that includes a center piece and a first, a second, a third, and a fourth radial piece; and wherein the first, the second, the third, and the fourth radial pieces are each coupled to the center piece at a hinge that allows the first, the second, the third, and the fourth radial pieces to each rotate with a rotation greater than 180° relative to the center piece independently, and wherein the first, the second, the third, and the fourth radial pieces each include an opening to receive a shelter support member.

6. The shelter of claim 4, wherein the first and second shelter support members are made of fiberglass.

7. The shelter of claim 1, wherein the upper corner connection mechanism and the lower corner connection mechanism are configured to receive the at least three leg members at an angle less than 90° relative to a bottom portion of the base members.

8. A collapsible shelter, comprising:
   a roof assembly that includes an intermediate connection mechanism coupled to a first shelter support member at a first end and coupled to a second shelter support member at a second end, wherein the intermediate connection mechanism includes a first piece coupled to a second piece by a coupling mechanism that passes through openings in the first piece and the second piece that are aligned, and wherein the first shelter support member and the second shelter support member rotate relative to one another with a rotation greater than 180°;
   a number of leg assemblies that each include a leg member and a base member;
   a number of corner assemblies that include an upper corner connection mechanism and a lower corner connection mechanism configured to receive the leg member at an angle less than 90° relative to a bottom portion of the base member; and
   a number of truss assemblies, wherein the number of truss assemblies are coupled to the number of corner assemblies, wherein the roof assembly is coupled to the number of truss assemblies of the portable collapsible shelter via the number of corner assemblies, and wherein the roof assembly includes a center connection mechanism coupled to the second shelter support member; and
   a number of internal support bodies, each situated within one of the number of leg assemblies so that an outer surface of the internal support bodies is flush with a number of inner surfaces of the number of leg assemblies, wherein each of the number of internal support bodies includes an opening to receive a pin that couples one of the number of lower corner connection mechanisms to one of the number of leg assemblies.

9. The shelter of claim 8, wherein the intermediate connection mechanism includes a surface that supports a shelter cover to prevent the shelter cover from contacting the first and second shelter support members.

10. The shelter of claim 8, wherein the roof assembly includes a slidable connection mechanism with that includes a first piece with a first opening and second opening to receive the first shelter support member and a second piece with an opening to receive a third shelter support member,
   wherein the first piece and the second piece are coupled together, where the first shelter support member and the third shelter support member rotate relative to one another,
   wherein the first piece is configured to allow the first shelter support member to pass through the first opening and second opening of the first piece, and
   wherein the first piece can pass over the first shelter support member along the longitudinal axis of the first shelter support member.

11. The shelter of claim 8, wherein the center connection mechanism includes a center piece and a first radial piece, a second radial piece, a third radial piece, and a fourth radial piece; and
   wherein the first radial piece, the second radial piece, the third radial piece, and the fourth radial piece are each coupled to the center piece where the first radial piece, the second radial piece, the third radial piece, and the fourth radial piece each independently rotate relative to the center piece, and wherein the first radial piece, the second radial piece, the third radial piece, and the fourth radial pieces each include an opening to receive the second shelter support member.

12. A collapsible shelter comprising:
   a roof assembly that includes:
   a number of connection mechanisms that each include a first piece with a first opening and second opening to receive a first shelter support member and a second piece with an opening to receive a second shelter support member,
      wherein the first piece and the second piece are coupled together and the first shelter support member and the second shelter support member rotate relative to one another, and
      wherein the first piece is configured to allow the first shelter support member to pass through the first opening and second opening of the first piece;
   a number of intermediate connection mechanisms that each include a first piece coupled to a second piece by a coupling mechanism that passes through openings in the first piece and the second piece that are aligned,
      wherein the first piece is coupled to the first shelter support member and the second piece is coupled to a third shelter support member, and
      wherein the first shelter support member and the third shelter support member rotate relative to one another with a rotation greater than 180°; and
   a center connection mechanism that includes a center piece and a first radial piece, a second radial piece, a third radial piece, and a fourth radial piece,
      wherein the first radial piece, the second radial piece, the third radial piece, and the fourth radial piece are each coupled to the center piece and the first radial piece, the second radial piece, the third radial piece, and the fourth radial piece each independently rotate relative to the center piece, and
      wherein the first radial piece, the second radial piece, the third radial piece, and the fourth radial pieces each include an opening to receive the third shelter support member;
   a number of leg assemblies that each include a leg member and a base member;
   a number of corner assemblies that include an upper corner connection mechanism and a lower corner connection mechanism configured to receive the leg member at an angle less than 90° relative to a bottom portion of the base member; and
   a number of internal support bodies, each situated within one of the number of leg assemblies so that an outer surface of the internal support bodies is flush with a number of inner surfaces of the number of leg assemblies, wherein each of the number of internal support bodies includes an opening to receive a pin that couples one of the number of lower corner connection mechanisms to one of the number of leg assemblies.

13. The shelter of claim 12, wherein the roof assembly is coupled the number of corner assemblies.

14. The shelter of claim 13, wherein the each of the number of corner assemblies is coupled to a truss assembly and a leg assembly.

15. The shelter of claim 14, wherein the corner assemblies are configured to receive a leg assembly at an angle that is less than 90° relative to a bottom portion of a base member of the leg assembly.

16. The shelter of claim 12, wherein the roof assembly has a peak that is approximately 3 feet higher than a top of a truss assembly.

17. The shelter of claim 12, wherein the first, second, and third shelter support members are fiberglass.

* * * * *